United States Patent
Kato et al.

(10) Patent No.: US 8,200,393 B2
(45) Date of Patent: Jun. 12, 2012

(54) VEHICLE STEERING APPARATUS

(75) Inventors: Hiroaki Kato, Hekinan (JP); Satoru Mikamo, Okazaki (JP)

(73) Assignee: JTEKT Corporation, Osaka-shi (JP)

( * ) Notice: Subject to any disclaimer, the term of this patent is extended or adjusted under 35 U.S.C. 154(b) by 731 days.

(21) Appl. No.: 12/174,873

(22) Filed: Jul. 17, 2008

(65) Prior Publication Data

US 2009/0024280 A1 Jan. 22, 2009

(30) Foreign Application Priority Data

Jul. 20, 2007 (JP) .................................. 2007-189557

(51) Int. Cl.
*A01B 69/00* (2006.01)

(52) U.S. Cl. .................. 701/41; 701/2; 701/91; 701/42; 180/412; 180/415; 180/446; 180/422

(58) Field of Classification Search .................... 701/41, 701/42, 43, 2, 91; 180/446, 444, 412, 422, 180/415

See application file for complete search history.

(56) References Cited

U.S. PATENT DOCUMENTS

| | | |
|---|---|---|
| 2002/0007239 A1 | 1/2002 | Matsumoto et al. |
| 2005/0228564 A1 | 10/2005 | Kato et al. |
| 2005/0273235 A1* | 12/2005 | Ohta et al. ...................... 701/41 |
| 2007/0107977 A1 | 5/2007 | Shibata |
| 2007/0107979 A1* | 5/2007 | Limpibunterng et al. ..... 180/446 |
| 2007/0192005 A1* | 8/2007 | Ishikawa et al. ................ 701/41 |

FOREIGN PATENT DOCUMENTS

| | | |
|---|---|---|
| JP | 2003-306161 | 10/2003 |
| JP | 2004-256008 | 9/2004 |
| JP | 2005-297719 | 10/2005 |
| JP | 2006-076453 | 3/2006 |
| JP | 2006-111048 | 4/2006 |
| JP | 2006-175981 | 7/2006 |

OTHER PUBLICATIONS

Japanese Office Action mailed Mar. 27, 2012 in Patent Application No. 2007-189557.

* cited by examiner

*Primary Examiner* — Behrang Badii
(74) *Attorney, Agent, or Firm* — Oblon, Spivak, McClelland, Maier & Neustadt, L.L.P.

(57) ABSTRACT

A vehicle steering apparatus 1 includes a variable gear ratio actuator 7, an IFS ECU 8, which controls the actuator 7, an EPS actuator 17, and an EPS ECU 18, which controls the EPS actuator 17. The variable gear ratio actuator 7 varies the transmission ratio between a steering wheel and steered wheels. The EPS actuator 17 applies an assist force that assists a steering operation. A microcomputer 43 of the EPS actuator 17 increases an inertia compensation current command Iti* (Iti**), which is a compensation component based on the differential value of a steering torque, during actuation of the variable gear ratio actuator 7, that is, when an ACT angle θta is changed.

9 Claims, 6 Drawing Sheets

VEHICLE STEERING APPARATUS

CROSS-REFERENCE TO RELATED APPLICATIONS

This application is based upon and claims the benefit of priority from prior Japanese Patent Application No. 2007-189557, filed on Jul. 20, 2007, the entire contents of which are incorporated herein by reference.

BACKGROUND OF THE INVENTION

The present invention relates to a vehicle steering apparatus, and more specifically to a vehicle steering apparatus provided with a variable transmission ratio device and a steering force assist device.

In recent years, steering control systems have been proposed which are provided with an active steering function. The steering control systems determine the steering characteristic of a vehicle by detecting vehicle-condition parameters such as the vehicle velocity and the yaw rate. Based on the determination result, the steering control systems control the steering angle (tire angle) of steered wheels to control the yaw moment of the vehicle.

For example, the vehicle steering apparatus disclosed in Japanese Laid-Open Patent Publication No. 2005-297719 is provided with a variable transmission ratio device as a device having an active steering function. The variable transmission ratio device changes the transmission ratio (gear ratio) between the steering wheel and the steered wheels. The gear ratio is changed by adding a second steering angle (ACT angle) of the steered wheels based on the activation of the motor to a first steering angle of the steered wheels based on a steering operation. When the vehicle is in an oversteer state, the variable transmission ratio device changes the ACT angle to control the tire angle in the direction opposite to the direction of the yaw moment (countersteering direction). In contrast, when the vehicle is in an understeer state, the variable transmission ratio device changes the transmission ratio such that the amount of change of the tire angle relative to steering operation of the steering wheel is reduced.

Also, the steering apparatus includes an electric power steering apparatus, which applies an assist force to a steering system using a motor as a driving source. The power assist control performed by the electric power steering apparatus is executed in cooperation with the active steering control. More specifically, when the vehicle is in the oversteer state, the electric power steering apparatus applies an assist force that encourages the driver to countersteer. In contrast, when the vehicle is in the understeer state, the electric power steering apparatus applies an assist force that suppresses increase of the steering wheel turning angle. Accordingly, the attitude of the vehicle is quickly stabilized.

However, in the above-mentioned steering apparatus, when the variable transmission ratio device is actuated, a torque (motor reaction force) in the direction opposite to the direction of the change of the ACT angle acts on the steering wheel. When the driver feels the motor reaction force as torque fluctuation, steering feel is deteriorated. In the active steering control, during counter control when in particular the change and the changing speed of the ACT angle is great, the influence of the motor reaction force tends to become further significant. In this point, there is room for improvement in the steering apparatus.

SUMMARY OF THE INVENTION

Accordingly, it is an objective of the present invention to provide a vehicle steering apparatus that improves steering feel by suppressing fluctuation of steering torque accompanying actuation of a variable transmission ratio device.

To achieve the above objective, one aspect of the present invention provides a vehicle steering apparatus for changing an angle of a steered wheel of a steering system of a vehicle in accordance with operation of a steering wheel by a driver. The vehicle steering apparatus includes a variable transmission ratio device including a motor. The variable transmission ratio device changes the transmission ratio between the steering wheel and the steered wheel by superimposing a first steering angle of the steered wheel based on a turning angle of the steering wheel, on a second steering angle of the steered wheel based on activation of the motor. The vehicle steering apparatus includes a steering force assist device for applying an assist force that assists steering operation to the steering system. The vehicle steering apparatus includes control means, which controls actuation of the steering force assist device. The control means calculates a basic assist component for controlling the steering force assist device, calculates a compensation component based on a differential value of a steering torque generated in the steering system, and computes a target assist force for controlling the steering force assist device by superimposing the basic assist component and the compensation component on each other. The control means increases the compensation component based on the differential value of the steering torque when the variable transmission ratio device is being actuated.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A vehicle steering apparatus 1 provided with a variable transmission ratio device and a steering force assist device according to one embodiment of the present invention will now be described with reference to drawings.

Figure 1:
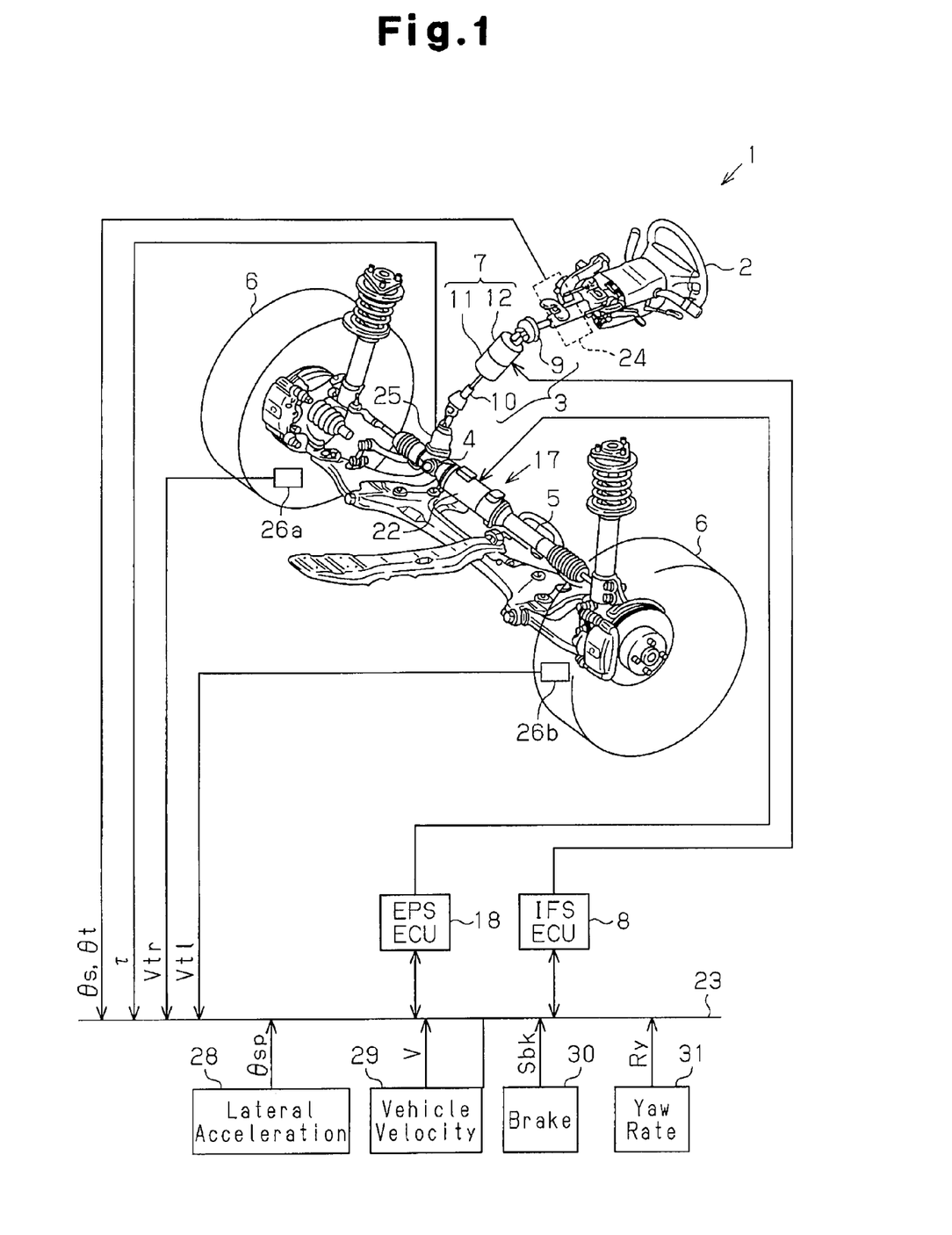
FIG. 1 is a schematic diagram showing the structure of a steering apparatus according to a preferred embodiment of the present invention.

FIG. 1 is a schematic diagram showing the structure of the steering apparatus 1 according to the preferred embodiment. As shown in the drawing, a steering shaft 3 to which a steering wheel 2 is fixed is coupled to a rack 5 via a rack and pinion mechanism 4. Rotation of the steering shaft 3 accompanying a steering operation is converted to a reciprocating linear motion of the rack 5 by the rack and pinion mechanism 4. The reciprocating linear motion of the rack 5 changes the steering angle of the steered wheels 6, or the tire angle, thereby changing the traveling direction of the vehicle.

The vehicle steering apparatus 1 includes a variable gear ratio actuator 7 and an IFS ECU (Intelligent Front Steering Electronic Control Unit) 8. The variable gear ratio actuator 7 functions as a variable transmission ratio device that varies the transmission ratio (gear ratio) of the steered wheels 6 to the turning angle of the steering wheel 2. The IFS ECU 8 controls actuation of the variable gear ratio actuator 7.

Specifically, the steering shaft 3 has a first shaft 9 and a second shaft 10. The steering wheel 2 is coupled to the first shaft 9. The second shaft 10 is coupled to the rack and pinion mechanism 4. The variable gear ratio actuator 7 includes a differential mechanism 11 and a motor 12. The differential mechanism 11 connects the first shaft 9 and the second shaft 10 to each other. The motor 12 drives the differential mechanism 11. The variable gear ratio actuator 7 adds rotation generated by driving the motor 12 to the rotation of the first shaft 9 accompanying the steering operation, and transmits the resultant rotation to the second shaft 10. In this manner, the variable gear ratio actuator 7 accelerates (or decelerates) the rotation of the steering shaft 3 transmitted to the rack and pinion mechanism 4.

Figure 2:
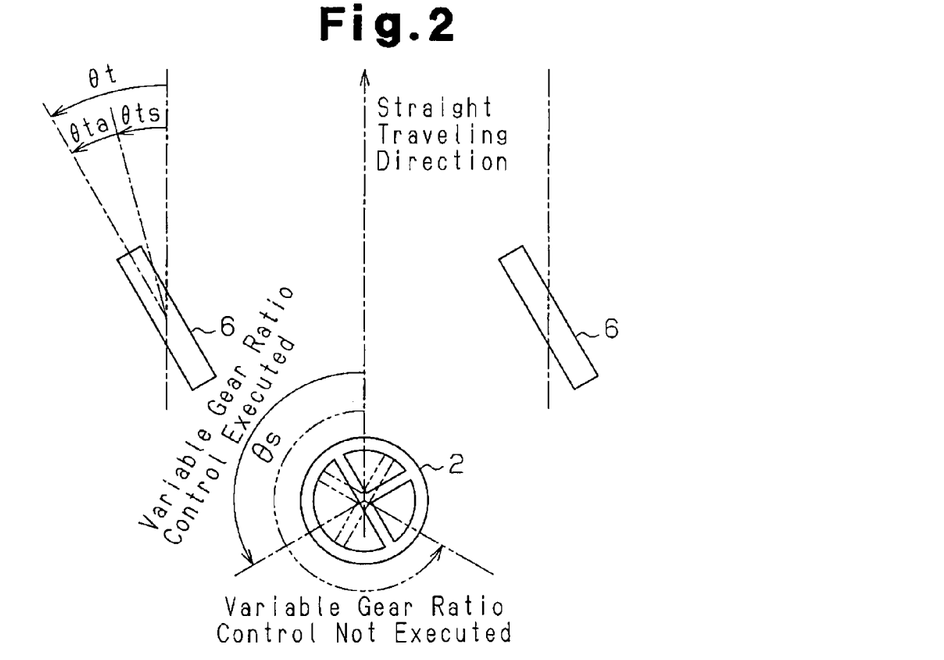
FIG. 2 is an explanatory diagram of variable gear ratio control executed in the steering apparatus of FIG. 1.
Figure 3:
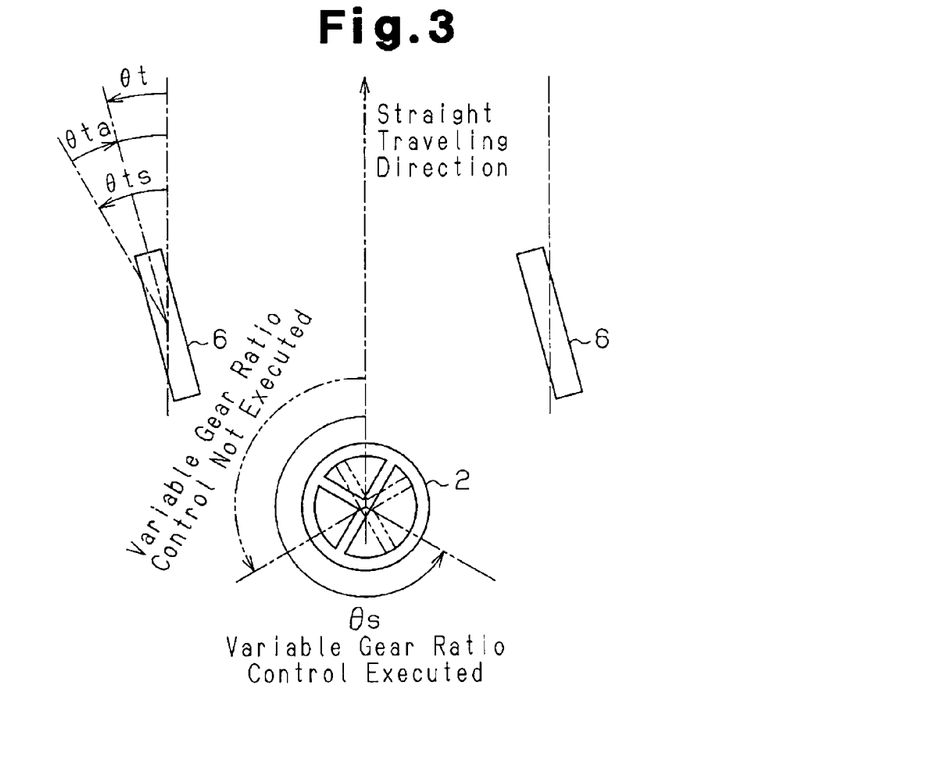
FIG. 3 is an explanatory diagram of variable gear ratio control executed in the steering apparatus of FIG. 1.

Referring to FIGS. 2 and 3, the variable gear ratio actuator 7 "superimposes" a steering angle of the steered wheels 6 produced by driving the motor (ACT angle $\theta ta$) on a steering angle of the steered wheels 6 produced by the steering operation (basic steering angle $\theta ts$) so as to vary the proportion of the tire angle $\theta t$ of the steered wheels 6 to the steering wheel turning angle $\theta s$, that is, the transmission ratio (gear ratio). The IFS ECU 8 controls the variable gear ratio actuator 7 by controlling the actuation of the motor 12. Thus, the IFS ECU 8 varies the gear ratio by controlling the ACT angle $\theta ta$ (variable gear ratio control).

In this case, to "superimpose" includes not only to add but also to subtract. When the gear ratio of the tire angle $\theta t$ to the steering wheel turning angle $\theta s$ is expressed with an overall gear ratio ($\theta s/\theta t$), the overall gear ratio is reduced by superimposing the basic steering angle $\theta ts$ on the ACT angle $\theta ta$ that is in the same direction as the basic steering angle $\theta ts$ (refer to FIG. 2 in which the tire angle $\theta t$ is large). The overall gear ratio is increased by superimposing the ACT angle $\theta ta$ that is in the opposite direction (refer to FIG. 3, in which the tire angle $\theta t$ is small). In the preferred embodiment, the basic steering angle $\theta ts$ corresponds to a first steering angle, and the ACT angle $\theta ta$ corresponds to a second steering angle.

Also, as shown in FIG. 1, the vehicle steering apparatus 1 includes an electric power steering (EPS) actuator 17 and an EPS ECU 18. The EPS actuator 17 applies an assist force to the steering system to assist the steering operation performed by a driver. The EPS actuator 17 corresponds to a steering force assist device. The EPS ECU 18 functions as control means for controlling operation of the EPS actuator 17.

The EPS actuator 17 is a rack assist type EPS actuator, in which a motor 22 is provided on the rack 5. The motor 22 functions as a driving source of the EPS actuator 17. An assist torque generated by the motor 22 is transmitted to the rack 5 via a ball screw mechanism (not shown). The EPS ECU 18 controls the assist torque generated by the motor 22 to control the assist force applied to the steering system (power assist control).

The IFS ECU 8, which controls the variable gear ratio actuator 7, and the EPS ECU 18, which controls the EPS actuator 17, are connected to each other via an in-vehicle network 23, or a controller area network (CAN). Sensors for detecting vehicle-condition parameters are connected to the in-vehicle network 23. More specifically, the in-vehicle network 23 is connected to a steering wheel turning angle sensor 24, a torque sensor 25, vehicle wheel speed sensors 26a, 26b, a lateral acceleration (lateral G) sensor 28, a vehicle velocity sensor 29, a brake sensor 30, and a yaw rate sensor 31. The vehicle-condition parameters, namely, a steering wheel turning angle $\theta s$, a steering torque $\tau$, wheel speeds Vtr, Vtl, a tire angle $\theta t$, a slip angle $\theta sp$, a vehicle velocity V, a brake signal Sbk, and a yaw rate Ry are obtained based on signals detected by the sensors 24, 25, 26a, 26b, and 28 to 31, and the parameters are input to the IFS ECU 8 and the EPS ECU 18 via the in-vehicle network 23. The IFS ECU 8 and the EPS ECU 18 transmit and receive control signals by communicating with each other via the in-vehicle network 23.

In the preferred embodiment, the torque sensor 25 is a twin resolver type torque sensor that detects the torque based on the torsion angle of a torsion bar detected by a pair of resolvers. The torque sensor 25 is provided at the middle of the second shaft 10, that is, between the variable gear ratio actuator 7 and the EPS actuator 17. Also, the tire angle $\theta t$ is obtained by superimposing the ACT angle $\theta ta$ on a value obtained by multiplying the steering wheel turning angle $\theta s$ by a base gear ratio of the rack and pinion mechanism 4, that is, the basic steering angle $\theta ts$. The slip angle $\theta sp$ is obtained based on the lateral acceleration detected by the lateral G sensor 28 and the yaw rate Ry.

The electrical configuration and control executed in the steering apparatus according to the preferred embodiment will now be described.

Figure 4:
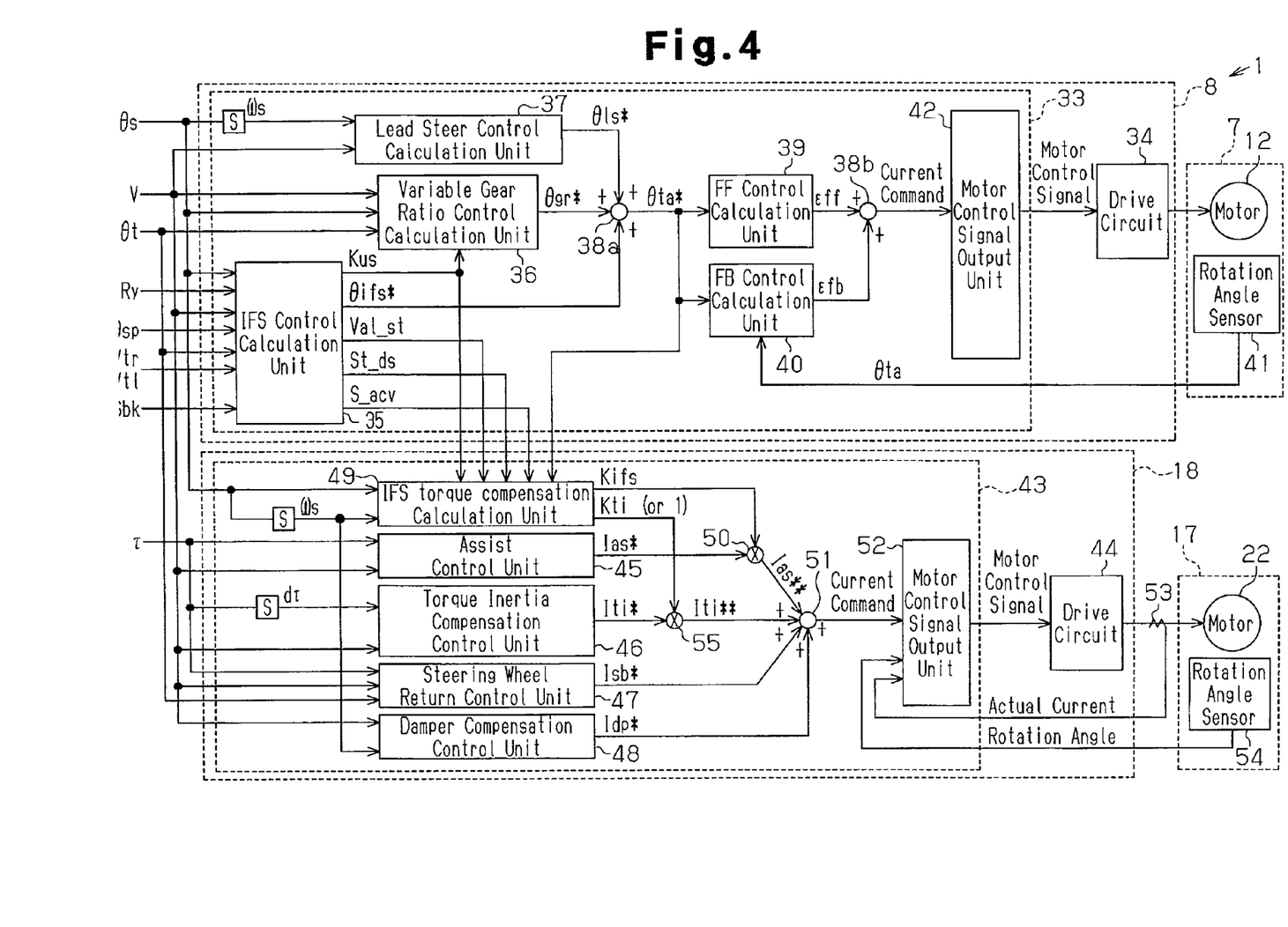
FIG. 4 is a control block diagram of the steering apparatus of FIG. 1.

FIG. 4 is a control block diagram of the vehicle steering apparatus 1. As shown in FIG. 4, the IFS ECU 8 includes a microcomputer 33 and a drive circuit 34. The microcomputer 33 outputs a motor control signal. The drive circuit 34 supplies the motor 12 with driving power based on the motor control signal.

In the preferred embodiment, the motor 12, which is a driving source of the variable gear ratio actuator 7, is a brushless motor. The drive circuit 34 supplies the motor 12 with three-phase (U, V, W) driving power based on the motor control signal received from the microcomputer 33.

The microcomputer 33 includes an IFS control calculation unit 35, a variable gear ratio control calculation unit 36, and a Lead Steer control calculation unit 37. Also, the microcomputer 33 includes an FF control calculation unit 39, an FB control calculation unit 40, an adder 38a, and a motor control signal output unit 42. The control calculation units 35-36 calculate control components and control signals of the ACT angle $\theta ta$ based on the input vehicle condition parameters. The microcomputer 33 generates a motor control signal for controlling the motor 12, that is, the actuation of the variable gear ratio actuator 7 based on the calculated control components.

The IFS control calculation unit 35 receives the steering wheel turning angle $\theta s$, the tire angle $\theta t$, the vehicle velocity V, the wheel speeds Vtr, Vtl, the brake signal Sbk, the yaw rate Ry, and the slip angle $\theta sp$. The IFS control calculation unit 35 calculates, based on the vehicle condition parameters, a control component of the ACT angle $\theta ta$ and a control signal (IFS control calculation) to achieve an active steering function. In this manner, the yaw moment of the vehicle is controlled based on the vehicle model.

More specifically, the IFS control calculation unit 35 determines the steering characteristic of the vehicle based on the input vehicle condition parameters. The IFS control calculation unit 35 calculates an IFS_ACT command angle $\theta ifs^*$, which serves as the control component of the ACT angle $\theta ta$, and a US control gain Kus.

The IFS_ACT command angle $\theta ifs^*$ is the control component that mainly corresponds to a case where the steering characteristic of the vehicle is oversteer (OS). Based on the IFS_ACT command angle $\theta ifs^*$, oversteer control is executed that changes the ACT angle $\theta ta$ to apply a steering angle (countersteer) in a direction opposite to the direction of the yaw moment. The US control gain Kus is a control gain that reduces the amount of change of the tire angle $\theta t$ corresponding to steering operation, or reduces the actual steered angle of the steered wheels 6 when the steering characteristic is understeer (US). The US control gain Kus is output to the variable gear ratio control calculation unit 36. The variable gear ratio control calculation unit 36 reduces the absolute value of the control component based on the US control gain Kus. In this manner, the above mentioned understeer control is executed.

In the preferred embodiment, an OS/US characteristic value Val_st representing the determination result of the steering characteristic determination and the US control gain Kus are output to the EPS ECU 18 as a control signal (see FIG. 1) together with the driver steering state St_ds generated by the IFS control calculation unit 35 and an active control signal S_acv representing the details of the active steering control that is being executed. The driver steering state St_ds is expressed by an analog value, which continuously change in accordance with the manipulation direction and the manipulation amount of the steering wheel 2. More specifically, the manipulation direction of the steering wheel 2 ("steering" or "steering return") is represented by signs (positive/negative), and the manipulation amount is represented by the absolute value. Based on these control signals, the EPS ECU 18 executes the power assist control, which acts in cooperation with the active steering control.

The variable gear ratio control calculation unit 36 receives the steering wheel turning angle $\theta s$, the tire angle $\theta t$ and the vehicle velocity V. Based on these vehicle-condition parameters and the control signals, the variable gear ratio control calculation unit 36 computes a variable gear ratio ACT command angle $\theta gr^*$ as a control component for changing the gear ratio in accordance with the vehicle velocity V (variable gear ratio control calculation).

The Lead Steer control calculation unit 37 receives the vehicle velocity V and the steering wheel turning speed $\omega s$. The steering wheel turning speed $\omega s$ is calculated by differentiating the steering wheel turning angle $\theta s$ (the same applies in the following). Based on the vehicle velocity V and the steering wheel turning speed $\omega s$, the Lead Steer control calculation unit 37 computes an LS_ACT command angle $\theta ls^*$ as a control component for improving the response of the vehicle in accordance with the steering wheel speed.

The IFS control calculation unit 35, the variable gear ratio control calculation unit 36, and the Lead Steer control calculation unit 37 output the control components calculated in the above calculations, namely, the IFS_ACT command angle $\theta ifs^*$, the variable gear ratio ACT command angle $\theta gr^*$, and the LS_ACT command angle $\theta ls^*$ to the adder 38a. The adder 38a superimposes the IFS_ACT command angle $\theta ifs^*$, the variable gear ratio ACT command angle $\theta gr^*$, and the LS_ACT command angle $\theta ls^*$ on one another to calculate the ACT command angle $\theta ta^*$, which serves as the control target of the ACT angle $\theta ta$.

The ACT command angle $\theta ta^*$ calculated by the adder 38a is input to the FF control calculation unit 39 and the FB control calculation unit 40. In the preferred embodiment, the ACT command angle $\theta ta^*$ is output to the EPS ECU 18 as a control signal, and is used for executing the above-mentioned cooperative power assist control. The FB control calculation unit 40 receives the ACT angle $\theta ta$ detected by a rotation angle sensor 41 provided in the motor 12. The FF control calculation unit 39 calculates a control amount $\epsilon ff$ through feedforward calculation based on the input ACT command angle $\theta ta^*$. The FB control calculation unit 40 calculates a control amount $\epsilon fb$ through feedback calculation based on the ACT command angle $\theta ta^*$ and the ACT angle $\theta ta$.

The FF control calculation unit 39 and the FB control calculation unit 40 output their calculated control amounts $\epsilon ff$ and $\epsilon fb$ to an adder 38b. The adder 38b superimposes the control amount $\epsilon ff$ and the control amount $\epsilon fb$ on each other. The calculation result is output to the motor control signal output unit 42 as a current command. The motor control signal output unit 42 generates a motor control signal based on the input current command, and outputs the motor control signal to the drive circuit 34.

Figure 5:
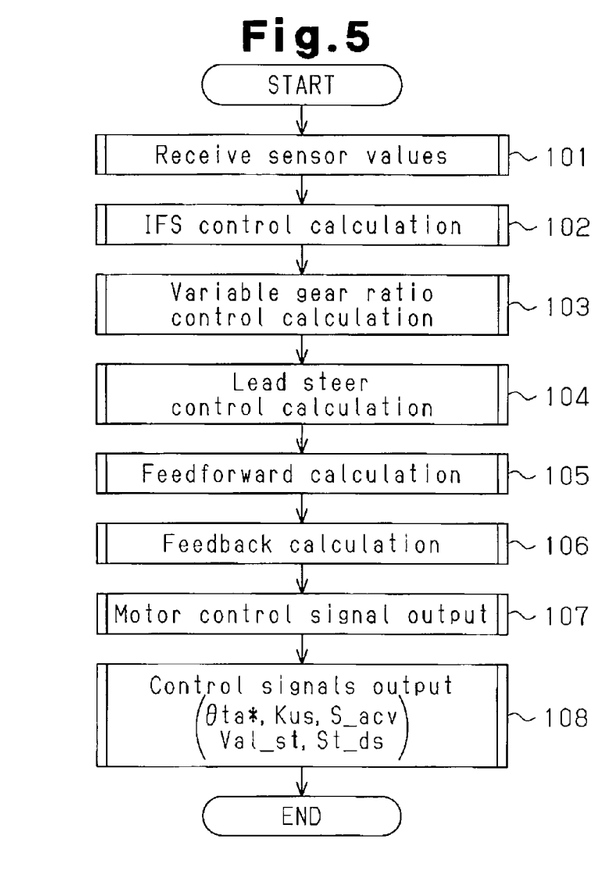
FIG. 5 is a flowchart showing a calculation process executed by the IFS ECU.

The flowchart showing the process executed by the IFS ECU 8 will now be described with reference to FIG. 5. As shown in FIG. 5, the microcomputer 33 receives sensor values from the sensors as vehicle-condition parameters (step 101). The microcomputer 33 first executes the IFS control calculation (step 102), and then executes the variable gear ratio control calculation (step 103) and the Lead Steer control calculation (step 104). The microcomputer 33 superimposes the IFS_ACT command angle $\theta ifs^*$, the variable gear ratio ACT command angle $\theta gr^*$, and the LS_ACT command angle $\theta ls^*$, which are calculated by executing the calculation processes of steps 102 to 104, on one another to calculate a control target of the ACT angle $\theta ta$, which is the ACT command angle $\theta ta^*$.

The microcomputer 33 performs the feedforward calculation (step 105) and the feedback calculation (step 106) based on the calculated ACT command angle $\theta ta^*$ to calculate a current command. The microcomputer 33 outputs a motor control signal based on the current command (step 107). The microcomputer 33 outputs the control signals, namely, the OS/US characteristic value Val_st, the US control gain Kus, the driver steering state St_ds, and the active control signal S_acv, and the ACT command angle $\theta ta^*$ to the EPS ECU 18 via the in-vehicle network 23 (step 108).

The control block diagram of EPS ECU 18 will now be described.

Like the IFS ECU 8, the EPS ECU 18 also includes a microcomputer 43 and a drive circuit 44 as shown in FIG. 4. In the preferred embodiment, the motor 22, which is the driving source of the EPS actuator 17, is also a brushless motor. The drive circuit 44 supplies the motor 22 with three-phase (U, V, W) driving power based on the motor control signal input from the microcomputer 43.

The microcomputer 43 includes an assist control unit 45, a torque inertia compensation control unit 46, a steering wheel return control unit 47, and a damper compensation control unit 48. These control units 45-48 calculate control components of an assist torque generated by the motor 22 based on input vehicle condition parameters.

In detail, the assist control unit 45 receives the steering torque $\tau$ and the vehicle velocity V. The assist control unit 45 calculates a basic assist current command Ias* as a control component that serves as a basis of the assist force based on the steering torque τ and the vehicle velocity V. More specifically, the greater the absolute value of the steering torque τ, and the slower the vehicle velocity V, the greater the basic assist current command Ias* becomes.

Also, the torque inertia compensation control unit 46 receives a steering torque differential value dτ, which is a differential value of the steering torque τ, and the vehicle velocity V. The torque inertia compensation control unit 46 calculates an inertia compensation current command Iti* as a control component for compensating for the influence of the inertia of the EPS actuator 17.

Figure 7:
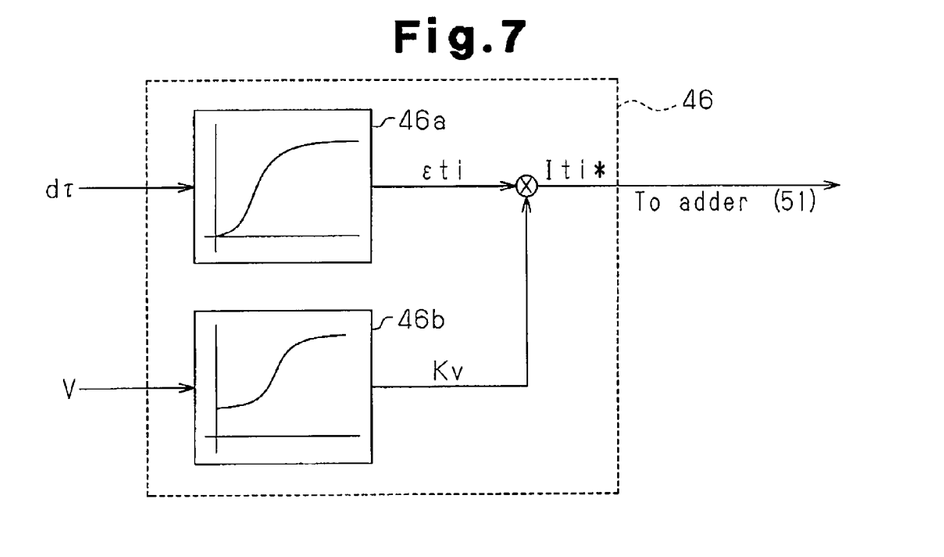
FIG. 7 is a control block diagram of the torque inertia compensation control unit of FIG. 4.

More specifically, as shown in FIG. 7, the torque inertia compensation control unit 46 is provided with a map 46a associating the steering torque differential value dτ with a basic compensation amount εti, and a map 46b associating the vehicle velocity V with a vehicle velocity gain Kv. In the map 46a, the abscissa axis represents the steering torque differential value dτ, and the ordinate axis represents the basic compensation amount εti. The greater the absolute value of the steering torque differential value dτ, the greater the basic compensation amount εti becomes, and as a result, the absolute value of the basic assist current command Ias* calculated by the assist control unit 45 is further increased. Similarly, in the map 46b, the abscissa axis represents the vehicle velocity V, and the ordinate axis represents the vehicle velocity gain Kv. The value of the vehicle velocity gain Kv is increased as the vehicle velocity V is increased. The torque inertia compensation control unit 46 calculates the inertia compensation current command Iti* using the basic compensation amount εti and the vehicle velocity gain Kv, which have been obtained by referring to the maps 46a, 46b. Specifically, the torque inertia compensation control unit 46 multiplies the basic compensation amount εti by the vehicle velocity gain Kv.

That is, "torque inertia compensation control" suppresses "torsion" generated in the steering system due to the inertia by increasing the assist force. More specifically, "torque inertia compensation control" is a control for suppressing "catching feeling (response lag)" at a time of "starting turning" in the steering operation, and "carried-away feeling (overshoot)" at a time of "finishing turning" caused by the inertia of the motor, the actuator, and the like. Also, for change of the tire angle that is not based on the steering torque input to the steering wheel, the torque inertia compensation control acts in a direction to cancel the change. This suppresses vibration generated in the steering system by applying a force that acts in a direction opposite to the steering direction to the steered wheels 6.

The steering wheel return control unit 47 receives the vehicle velocity V, the steering torque τ, and the tire angle θt, and the damper compensation control unit 48 receives the vehicle velocity V and the steering wheel turning speed ωs. The steering wheel return control unit 47 calculates a steering wheel return current command Isb*, which is a control component for improving the return characteristic of the steering wheel 2. The damper compensation control unit 48 calculates a damper compensation current command Idp*, which is a control component for improving the power assist characteristic of the vehicle when the vehicle is traveling at a high velocity.

The microcomputer 43 includes an IFS torque compensation control unit 49 in addition to the above-mentioned control units. The IFS torque compensation control unit 49 calculates an IFS torque compensation gain Kifs for executing the power assist control, which is executed in cooperation with the active steering control, to improve the steering feel during the active steering control.

The IFS torque compensation control unit 49 receives, together with the steering wheel turning angle θs and the steering wheel turning speed ωs, various types of control signals output from the IFS ECU 8, namely, the OS/US characteristic value Val_st, the US control gain Kus, the driver steering state St_ds, the active control signal S_acv, and the ACT command angle θta* via the in-vehicle network 23. The IFS torque compensation control unit 49 calculates the IFS torque compensation gain Kifs based on the input vehicle condition parameters and the control signals.

During oversteer, the IFS torque compensation control unit 49 calculates the IFS torque compensation gain Kifs, which executes application of an assist force that encourages the driver to countersteer. More specifically, the IFS torque compensation control unit 49 calculates the IFS torque compensation gain Kifs that reduces the basic assist current command Ias*, which is a basic assist component. During understeer, the IFS torque compensation control unit 49 computes the IFS torque compensation gain Kifs that executes application of an assist force that suppresses increase of the steering wheel turning angle.

The IFS torque compensation gain Kifs calculated by the IFS torque compensation control unit 49 is input to a multiplier 50 together with the basic assist current command Ias* calculated by the assist control unit 45.

When the multiplier 50 multiplies the current command Ias* by the IFS torque compensation gain Kifs, the corrected basic assist current command Ias is obtained. The basic assist current command Ias is input to an adder 51 together with other compensation components, namely, the inertia compensation current command Iti* (Iti**), the steering wheel return current command Isb*, and the damper compensation current command Idp*. The adder 51 calculates a current command, which is a control target of the assist torque generated by the motor 22 by superimposing the control components on the basic assist current command Ias**.

The current command calculated by the adder 51 is input to a motor control signal output unit 52. The motor control signal output unit 52 receives the actual current detected by a current sensor 53 and the rotation angle detected by a rotation angle sensor 54. The motor control signal output unit 52 generates a motor control signal by performing feedback control based on the current command, the actual current, and the rotation angle, and outputs the motor control signal to the drive circuit 44.

Figure 6:
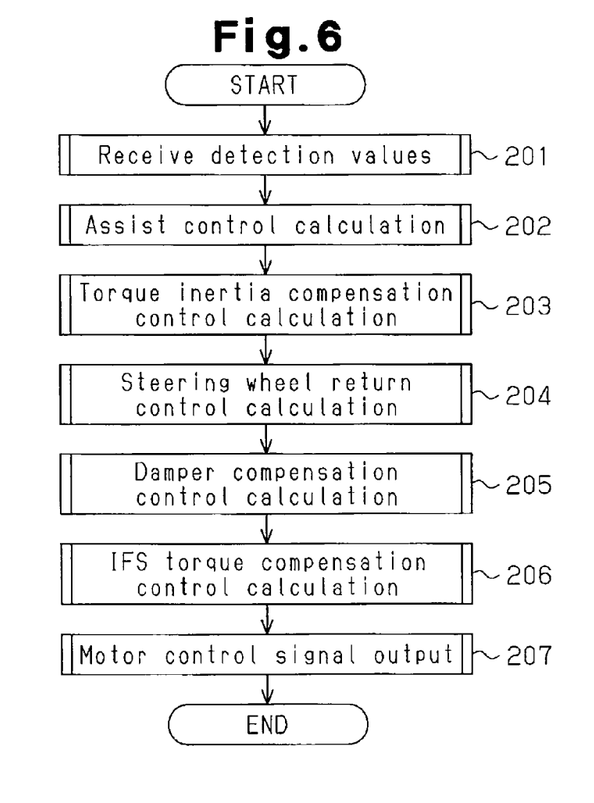
FIG. 6 is a flowchart showing a calculation process executed by the EPS ECU.

Processes executed by the EPS ECU 18 will now be described with reference to FIG. 6. As shown in FIG. 6, the microcomputer 43 receives detection values from the sensors as the vehicle-condition parameters (step 201), and first performs the assist control calculation (step 202). Then, the microcomputer 43 performs the torque inertia compensation control calculation (step 203), the steering wheel return control calculation (step 204), and the damper compensation control calculation (step 205), and subsequently performs the IFS torque compensation control calculation (step 206).

Then, in step 207, the microcomputer 43 corrects the basic assist current command Ias* by multiplying the basic assist current command Ias*, which has been calculated by the assist control calculation in step 202, by the IFS torque compensation gain Kifs calculated in step 206. The microcomputer 43 superimposes the corrected basic assist current command Ias** on the inertia compensation current command Iti*, the steering wheel return current command Isb*, and the damper compensation current command Idp* calculated in step 203 to step 205 so as to calculate the current command, which serves as the control target, and outputs the motor control signal based on the current command.

(Steering Torque Fluctuation Suppression Control During Actuation of Variable Transmission Ratio Device)

Next, a steering torque fluctuation suppression control during actuation of the variable transmission ratio device in the vehicle steering apparatus will now be described.

As described above, when the variable transmission ratio device is actuated, a torque (motor reaction force) that is in the opposite direction to the direction in which the ACT angle is changed acts on the steering wheel. When the driver feels the motor reaction force as fluctuation of the steering torque, the steering feel deteriorates.

Taking this point into consideration, in the vehicle steering apparatus 1 of the preferred embodiment, when the ACT angle θta, which is the second steering angle based on the activation of the motor, is changed during actuation of the variable gear ratio actuator 7, which serves as the variable transmission ratio device, the microcomputer 43 of the EPS ECU 18 increases the inertia compensation current command Iti*, which is the compensation component based on the differential value of the steering torque.

More specifically, during actuation of the variable gear ratio actuator 7, the steering system is in a twisted state caused by the response delay of the steered wheels 6 (and the steering wheel 2) due to the inertia. The torque applied to the steering wheel 2 (motor reaction force) is increased as the "torsion of the steering system" is increased, that is, as the response delay of the steered wheels 6 is increased.

As described above, the "torsion of the steering system" caused by the inertia is suppressed by increasing the inertia compensation current command Iti*, that is, by intensifying the torque inertia compensation control. That is, by applying an assist force that assists the change of the tire angle θt (ACT angle θta) caused by the actuation of the variable gear ratio actuator 7, the response of the steered wheels 6 is improved, thereby suppressing the torsion of the steering system. This reduces the motor reaction force that acts on the steering wheel 2, and suppresses the fluctuation of the steering torque caused by the motor reaction force.

More specifically, as shown in FIG. 4, in the preferred embodiment, the IFS torque compensation control unit 49 in the microcomputer 43 of the EPS ECU 18 calculates the inertia compensation gain Kti for intensifying the torque inertia compensation control during the above-mentioned actuation of the variable gear ratio actuator 7 together with the IFS torque compensation gain Kifs.

The inertia compensation gain Kti calculated by the IFS torque compensation control unit 49 is input to a multiplier 55 together with the inertia compensation current command Iti* calculated by the torque inertia compensation control unit 46. In other words, the inertia compensation current command Iti* is corrected by being multiplied by inertia compensation gain Kti. The multiplier 55 outputs the corrected inertia compensation current command Iti to the adder 51. The adder 51 adds up the basic assist current command Ias and the superimposed resultant of the other compensation components Iti**, Isb*, Idp*, so that the torque inertia compensation control is intensified.

The IFS torque compensation control unit 49 will now be described with reference to FIG. 8. The IFS torque compensation control unit 49 includes an IFS torque compensation gain calculation unit 61 and an inertia compensation gain calculation unit 62.

The IFS torque compensation gain calculation unit 61 receives various types of signals Val_st, St_ds, Kus, θta*, S_acv, θs, ωs, and calculates and outputs the IFS torque compensation gain Kifs to the multiplier 50.

The inertia compensation gain calculation unit 62 receives various types of signals S_acv, ωs, ωta*, and then calculates and outputs the inertia compensation gain Kti to the multiplier 55. The ACT command angular velocity ωta* is obtained by differentiating the ACT command angle θta*, which is the control target of the ACT angle θta. The inertia compensation gain calculation unit 62 determines the "degree of the ACT angle θta" based on the ACT command angular velocity ωta*, and calculates the inertia compensation gain Kti.

More specifically, the inertia compensation gain calculation unit 62 includes a map 63, a countersteering determination unit 64, and a switching control unit 65. The map 63 associates the ACT command angular velocity ωta* with the inertia compensation gain Kti. In detail, in the map 63, the inertia compensation gain Kti increases the inertia compensation current command Iti* as the absolute value of the ACT command angular velocity ωta* is increased. The abscissa axis in the map 63 represents the ACT command angular velocity ωta*, and the ordinate axis represents the inertia compensation gain Kti. The base value of the inertia compensation gain Kti in the map 63 is one. That is, the value of the inertia compensation gain Kti is set greater than or equal to one. The inertia compensation gain calculation unit 62 outputs the inertia compensation gain Kti through the calculation based on the map 63.

In general, when the ACT angle θta, which is the second steering angle based on the activation of the motor, is significantly changed, the absolute value of the ACT command angular velocity ωta* is increased. In this case, the variable gear ratio actuator 7 is rapidly actuated to promptly change the ACT angle θta. At this time, the response delay due to the inertia of the steering system becomes significant, and the torsion of the steering system is increased. Accordingly, the motor reaction force that acts on the steering wheel 2 is increased.

In the preferred embodiment, the greater the change of the ACT angle θta as described above, the greater the inertia compensation current command Iti*, which is the compensation component based on the differential value of the steering torque, is caused to become. This effectively reduces the motor reaction force that acts on the steering wheel 2, and suppresses the fluctuation of the steering torque caused by the motor reaction force.

The oversteer control will now be described.

When the oversteer control is performed, the countersteering determination unit 64 of the IFS torque compensation control unit 49 determines whether countersteering is being performed by the driver. During oversteer control, the inertia compensation gain calculation unit 62 outputs the inertia compensation gain Kti that intensifies the torque inertia compensation control only when it is determined that countersteering is being performed. In other words, during the oversteer control, the intensification of the torque inertia compensation control is executed when the countersteering is being performed, and stopped when the countersteering is not performed.

More specifically, in the oversteer control, since the change of the ACT angle θta (degree and speed) is significant, the influence of the motor reaction force is significant. Therefore, the intensification of the torque inertia compensation control as described above is more effective when it is performed while the oversteer control is executed.

The reason for stopping the intensification of the torque inertia compensation control will now be described.

In the preferred embodiment, during oversteer, the IFS torque compensation control unit 49 calculates the IFS torque compensation gain Kifs that reduces the basic assist current command Ias*. Accordingly, the control is performed that reduces application of an assist force to encourage the driver to countersteer. However, for the changes of the tire angle that do not change the steering torque input to the steering wheel, the torque inertia compensation control acts in a direction to cancel the change of the tire angle. That is, during oversteer, the torque inertia compensation control acts in a direction to cancel the reduction control of the assist force executed to encourage the driver to countersteer. Thus, when the assist force is applied to encourage the driver to countersteer, the intensification of the torque inertia compensation control is stopped.

Figure 8:
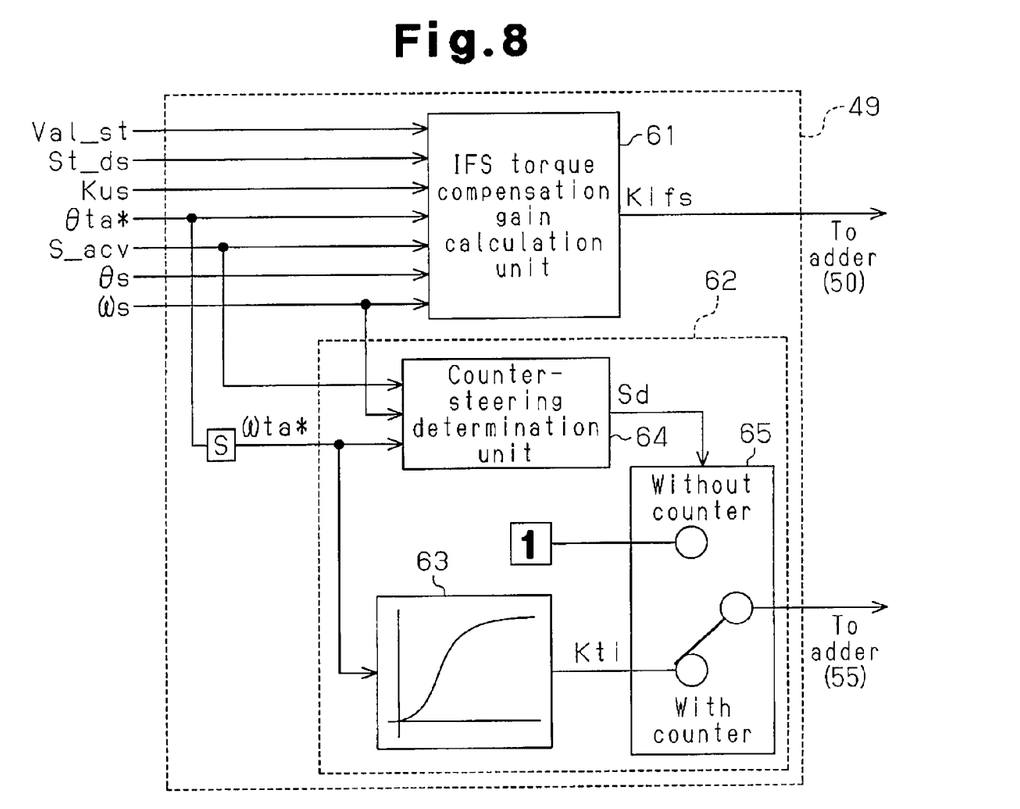
FIG. 8 is a control block diagram of the IFS torque compensation control unit of FIG. 4.

More specifically, as shown in FIG. 8, the countersteering determination unit 64 receives the active control signal S_acv, the ACT command angular velocity ωta*, and the steering wheel turning speed ωs, and outputs a determination signal Sd. The countersteering determination unit 64 executes the countersteering determination based on the vehicle-condition parameters and control signals.

The process executed by the countersteering determination unit 64 will now be described with reference to the flowchart in FIG. 9.

Figure 9:
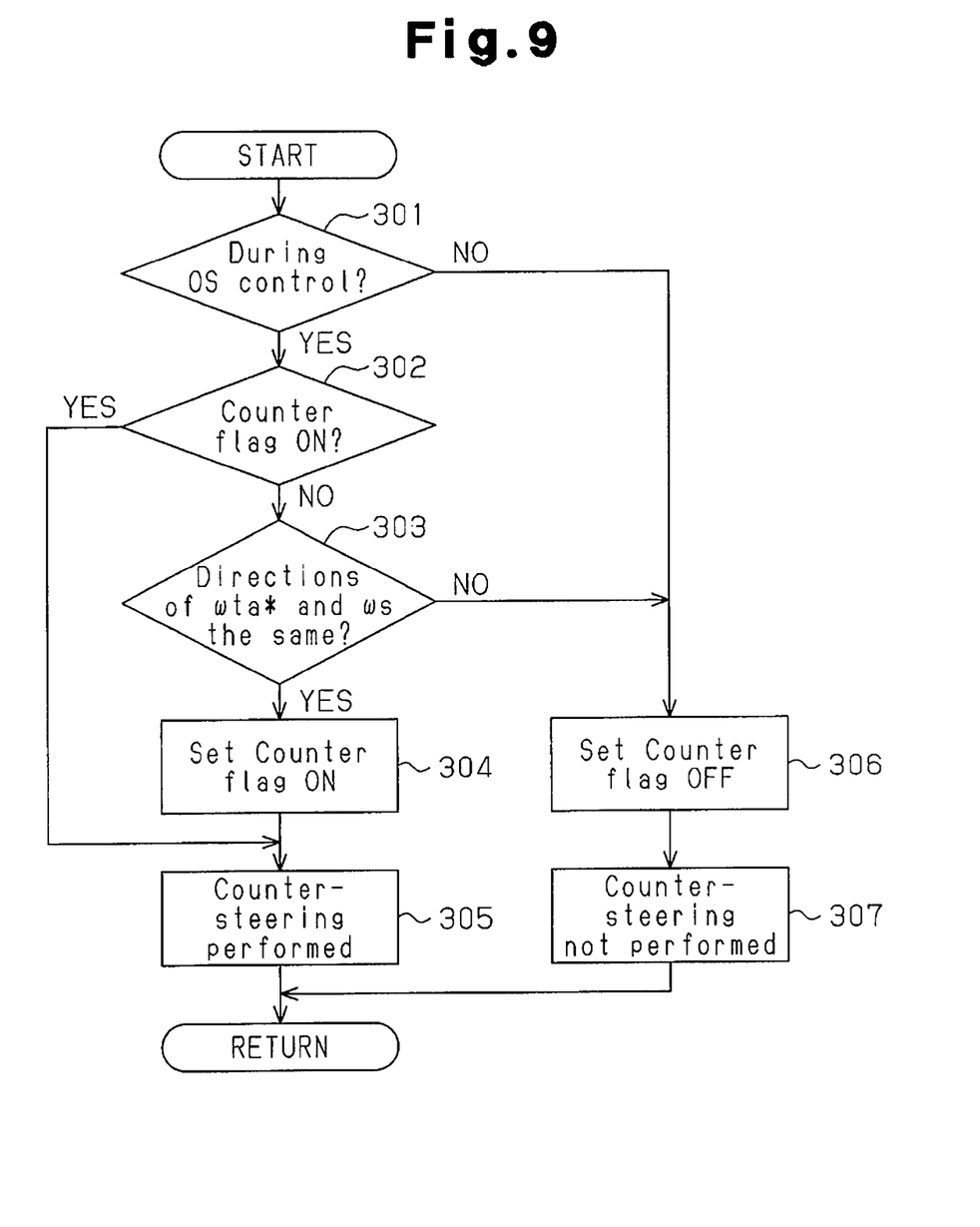
FIG. 9 is a flowchart showing processes of oversteer control determination and countersteering determination executed by the countersteering determination unit of FIG. 8.

As shown in FIG. 9, the countersteering determination unit 64 first determines whether the oversteer control (OS control) is being executed based on the active control signal S_acv (step 301). If it is determined that the OS control is being executed (step 301: YES), the countersteering determination unit 64 subsequently determines whether a counter flag has been already set (step 302). If the counter flag has not been set yet (step 302: NO), the countersteering determination unit 64 determines whether the driver is performing countersteering, that is, the countersteering determination unit 64 performs the countersteering determination (step 303).

The countersteering determination in step 303 is performed based on whether the direction (sign) of the ACT command angular velocity ωta* and the direction (sign) of the steering wheel turning speed ωs are the same. If it is determined that the direction of the ACT command angular velocity ωta* and the direction of the steering wheel turning speed ωs are the same (step 303: YES), the countersteering determination unit 64 sets the counter flag ON (step 304). At this time, the countersteering determination unit 64 determines that countersteering is performed by the driver (step 305).

If the countersteering determination unit 64 determines in step 301 that the OS control is not being executed (step 301: NO), the countersteering determination unit 64 sets the counter flag OFF (step 306). At this time, the countersteering determination unit 64 determines that countersteering is not performed by the driver (step 307). Also, if it is determined in step 304 that the direction of the ACT command angular velocity ωta* and the direction of the steering wheel turning speed ωs are not the same (step 303: NO), the countersteering determination unit 64 turns off the counter flag (step 306). At this time, the countersteering determination unit 64 determines that countersteering is not performed by the driver (step 307).

Furthermore, if it is determined in step 302 that the counter flag has already been set on (step 302: YES), the countersteering determination unit 64 determines that countersteering is performed by the driver without executing the processes in steps 303, 304 (step 305). Thus, during execution of the single OS control, after it is determined that countersteering is being performed, the counter flag is turned on during the OS control, that is, it is determined that the countersteering is being performed.

The result of the countersteering determination by the countersteering determination unit 64 is input to the switching control unit 65 as the determination signal Sd as shown in FIG. 8 together with the inertia compensation gain Kti. The switching control unit 65 outputs the inertia compensation gain Kti when the input determination signal Sd represents that the countersteering is being performed, and outputs "1" when the input determination signal Sd represents that the countersteering is not being performed. During the oversteer control, the intensification of the inertia compensation control is executed or stopped in accordance with whether the countersteering is being performed through the above-mentioned processes.

As described above, the preferred embodiment has the following advantages.

(1) When the variable gear ratio actuator 7, which serves as the variable transmission ratio device, is actuated, that is, when the ACT angle θta, which is the second steering angle based on the activation of the motor, is changed, the microcomputer 43 of the EPS ECU 18 increases the inertia compensation current command Iti* (Iti**), which serves as the compensation component based on the differential value of the steering torque.

That is, during the actuation of the variable gear ratio actuator 7, the steering system is in the twisted state due to the response delay of the steered wheels 6 (and the steering wheel 2) caused by the inertia. The reaction force torque (motor reaction force) that acts on the steering wheel 2 is increased as the torsion of the steering system is increased, that is, as the response delay of the steered wheels 6 is increased. However, at this time, by increasing the inertia compensation current command Iti*, that is, by intensifying the torque inertia compensation control as described above, the torsion of the steering system due to the inertia is suppressed. More specifically, by applying the assist force that assists a change of the tire angle θt (ACT angle θta) caused by actuation of the variable gear ratio actuator 7, the response of the steered wheels 6 is improved, thereby suppressing the above mentioned torsion of the steering system. Accordingly, the motor reaction force that acts on the steering wheel 2 due to the actuation of the variable gear ratio actuator 7 is reduced. As a result, fluctuation of the steering torque caused by the motor reaction force is suppressed, which improves the steering feel.

(2) When the second steering angle based on the activation of the motor, that is, the ACT angle θta is changed, the greater the change, the greater the inertia compensation current command Iti* (Iti**) is made by the microcomputer 43.

That is, the more abrupt the actuation of the variable gear ratio actuator 7 to greatly change the ACT angle θta, that is, the more abrupt the motion, the greater the influence of the motor reaction force becomes. Therefore, according to the above configuration, the fluctuation of the steering torque accompanying the actuation of the variable gear ratio actuator 7 is more effectively suppressed.

(3) When the oversteer control is executed that changes the ACT angle θta to apply a steering angle (countersteering) in a direction opposite to the direction of the yaw moment of the vehicle, the microcomputer 43 executes control that increases the inertia compensation current command Iti* (Iti**).

That is, since the change of the ACT angle θta (degree and speed) is significant, the oversteer control, which applies the steered wheels with a steering angle in the counter direction, provides significant influence on the motor reaction force. Therefore, by intensifying the torque inertia compensation control during the oversteer control, more significant effect is obtained in suppressing the fluctuation of the steering torque.

(4) During oversteer, the microcomputer 43 executes control that reduces the application of an assist force to encourage the driver to perform countersteering. When the reduction control of the assist force is executed, the torque inertia compensation control is not intensified.

That is, for a change of the tire angle that does not change the steering torque to be input to the steering wheel, the torque inertia compensation control acts in a direction to cancel the reduction control. That is, during oversteer, the torque inertia compensation control acts in a direction to cancel the reduction control of the assist force executed to encourage the driver to perform countersteering. However, the above-mentioned configuration prevents such interference with the assist force control for encouraging countersteering.

The preferred embodiment may be modified as follows.

The ACT command angular velocity ωta* is used to calculate the inertia compensation gain Kti from the map 63. However, instead of the ACT command angular velocity ωta*, other parameters corresponding to the change of the ACT angle θta may be used. For example, the differential value of the ACT command angular velocity (angular acceleration), the actual ACT angular velocity, the ACT angular acceleration, the actual current value supplied to the motor 12, and the current command value may be used. Also, the inertia compensation gain Kti may be calculated using method other than the map 63.

The increase control of the inertia compensation current command Iti* may be executed any time other than during the oversteer control and during countersteering. The increase control of the inertia compensation current command Iti* may be executed regardless of whether the oversteer control is being performed as long as the variable transmission ratio device is being actuated.

Also, as long as the reduction control of the assist force for encouraging countersteering is being executed, the increase control of the inertia compensation current command Iti* may be stopped even if the oversteer control using the variable transmission ratio device is not being performed.

As the assist force control for encouraging countersteering, a steering reaction force in the counter direction may be positively generated, for example, by superimposing the basic assist component on the control component in the counter direction, instead of reducing the assist force. In this case also, the same advantages as the preferred embodiment are obtained by stopping increasing the inertia compensation current command Iti*.

The corrected inertia compensation current command Iti** is increased by multiplying the inertia compensation current command Iti* by the inertia compensation gain Kti, however, the inertia compensation current command Iti* itself may be increased by switching the calculation map based on activating and deactivating of the variable transmission ratio device.

Instead of superimposing the inertia compensation current command Iti*(Iti**), the steering wheel return current command Isb*, and the damper compensation current command Idp* as the compensation components, other compensation components may be used as long as compensation components based on the differential value of the steering torque are superimposed on one another.

The present examples and embodiments are to be considered as illustrative and not restrictive, and the invention is not to be limited to the details given herein, but may be modified within the scope and equivalence of the appended claims.

What is claimed is:

1. A vehicle steering apparatus for changing an angle of a steered wheel of a steering system of a vehicle in accordance with operation of a steering wheel by a driver, the vehicle steering apparatus comprising:

a variable transmission ratio device including a motor, the variable transmission ratio device changing the transmission ratio between the steering wheel and the steered wheel by superimposing a first steering angle of the steered wheel based on a turning angle of the steering wheel, on a second steering angle of the steered wheel based on activation of the motor;

a steering force assist device, which is different from the variable transmission ratio device, for applying an assist force that assists a driver steering operation to the steering system; and control means, which controls actuation of the steering force assist device, wherein the control means calculates a basic assist component for controlling the steering force assist device, corrects the basic assist component to counteract oversteer or understeer, calculates a compensation component based on a differential value of a steering torque generated in the steering system, and computes a target assist force for controlling the corrected steering force assist device by superimposing the basic assist component and the compensation component on each other, and wherein the control means increases the compensation component based on the differential value of the steering torque when the variable transmission ratio device is being actuated.

2. The vehicle steering apparatus according to claim 1, wherein the control means increases the compensation component based on the differential value of the steering torque by a greater amount as the amount of change of the second steering angle is increased.

3. The vehicle steering apparatus according to claim 2, wherein the variable transmission ratio device performs oversteer control when the steering characteristic of the vehicle is in an oversteer state, and changes the second steering angle in a direction opposite to a yaw moment acting on the vehicle.

4. The vehicle steering apparatus according to claim 3, wherein the control means increases the compensation component based on the differential value of the steering torque during the oversteer control.

5. The vehicle steering apparatus according to claim 4, further comprising:

countersteering determination means, which determines whether countersteering is being performed during the oversteer control, wherein the control means reduces the assist force to encourage the countersteering when the countersteering is not being performed.

6. The vehicle steering apparatus according to claim 5, wherein the control for increasing the compensation component based on the differential value of the steering torque is stopped during reduction control of the assist force.

7. The vehicle steering apparatus according to claim 1, wherein the control means includes a torque inertia compensation control unit, which compensates for torque inertia generated in the steering force assist device.

8. The vehicle steering apparatus according to claim 7, wherein the compensation component includes a compensation component of the torque inertia computed by the torque inertia compensation control unit.

9. The vehicle steering apparatus according to claim 8, wherein the compensation component of the torque inertia is calculated based on the differential value of the steering torque and the vehicle velocity.

\* \* \* \* \*